United States Patent Office 3,555,118
Patented Jan. 12, 1971

3,555,118
UNSATURATED POLYESTERS OF NITRILOTRI-
ACETIC ACID, A POLYHYDRIC ALCOHOL AND
AN UNSATURATED POLYCARBOXYLIC ACID
Bruce N. Wilson, Niagara Falls, N.Y., assignor to Hooker
Chemical Corporation, Niagara Falls, N.Y., a corporation of New York
No Drawing. Filed Jan. 26, 1968, Ser. No. 700,688
Int. Cl. C08f 21/02; C08g 17/12
U.S. Cl. 260—870
6 Claims

ABSTRACT OF THE DISCLOSURE

Novel thermosetting esters are provided by reacting nitrilotriacetic acid with an unsaturated hydroxy composition. Preferably the nitrilotriacetic acid is reacted with a polyhydric alcohol and then with a polycarboxylic compound, wherein at least one of the polyhydric alcohol and the polycarboxylic compound contain aliphatic carbon-to-carbon unsaturation. The unsaturated esters can be cured with an olefinic cross-linking agent to form thermoset compositions useful as coatings and in castings.

BACKGROUND OF THE INVENTION

It has not been previously known to utilize nitrilotriacetic acid (a tightly structured tricarboxylic acid containing an amino nitrogen) in the formation of thermosetting esters. One skilled in the art would expect poor properties and reactivity from the acid because of the presence of the amino nitrogen. It was therefore surprising to discover that nitrilotriacetic acid could be employed in the production of thermosetting esters which can be cured with an olefinic cross-linking agent to form thermoset compositions useful as coatings and in castings. Also fortuitous, is the economy involved in the preparation of the polyesters versus the use of other tricarboxylic acids and similar structures known to the art.

It is the object of this invention to provide novel unsaturated esters of nitrilotriacetic acid. It is also the object of this invention to provide thermosetting esters which can be cured with an olefinic cross-linking agent to form thermoset compositions. A further object of this invention is to provide novel compositions useful as coatings and in castings. Other objects of this invention will become apparent from the following disclosure.

SUMMARY OF THE INVENTION

This invention relates to novel thermosetting esters and cured thermoset compositions. More particularly, the invention relates to novel thermosetting esters which are provided by reacting nitrilotriacetic acid with an unsaturated hydroxy composition and to the thermoset compositions produced by curing said esters with an olefinic cross-linking agent. A preferred aspect of the invention relates to a polymerizable ester of components comprising (1) nitrilotriacetic acid, (2) a polyhydric alcohol, and (3) a polycarboxylic compound, wherein at least one of said polyhydric alcohol and polycarboxylic compound contain aliphatic carbon-to-carbon unsaturation.

DESCRIPTION OF THE PREFERRED EMBODIMENT

In accordance with this invention, there is provided an ester produced by reacting nitrilotriacetic acid with an unsaturated hydroxy composition. The unsaturated hydroxy composition can take the form of any aliphatically unsaturated monohydric alcohol or any polyhydric alcohol. When a polyhydric alcohol is employed, the resulting polyester can be further reacted with a polycarboxylic compound, wherein either or both the polyhydric alcohol and the polycarboxylic compound contain aliphatic carbon-to-carbon unsaturation.

Typical monohydric alcohols containing aliphatic carbon-to-carbon unsaturation include those alcohols derived from ethylene; propene; butene; pentene; hexene; 3,3-dimethyl-1-butene; and the like. Typical polyhydric alcohols include ethylene glycol; diethylene glycol; propylene glycol; dipropylene glycol; 1,4-butanediol; 1,4-butenediol; 1,4-butynediol; 1,3-butanediol; 1,2-butanediol; 1,2-pentanediol; 1,3-pentanediol; 1,4-pentanediol; 1,5-pentanediol; 1,6-hexanediol; neopentyl glycol; 2,2,4-trimethyl-1,3-pentanediol; glycerol; hexanetriol; butanetriol; trimethylol propane; trimethylmethane; pentaerythritol; mannitol; and the like. In the preferred process of this invention, the nitrilotriacetic acid is reacted with a glycol, of which ethylene glycol is preferred. The alcohol is employed in sufficient quantity to esterify substantially all of the carboxyl groups of the nitrilotriacetic acid.

Suitable polycarboxylic compounds include polycarboxylic acids or acid anhydrides or acid halides. Examples of unsaturated compounds are the respective compounds of maleic; fumaric; substituted maleic and fumaric such as citraconic, chloromaleic, mesaconic and pyrocinchoninic; acetylene dicarboxylics, substituted succinics such as aconitic and itaconic; and the like. In the preferred embodiment of this invention, an unsaturated polycarboxylic compound is employed, and the preferred compound is maleic acid, anhydride or halide. The polycarboxylic compound is employed in sufficient quantity to esterify substantially all of the free hydroxyl groups of the alcohol. If a one-step process is employed, as described hereinafter, the compound is employed so as to leave unesterified sufficient hydroxyl groups to esterify substantially all of the nitrilotriacetic acid's carboxyl groups.

The following synthesis procedure is typical of a two-step process useful in preparing the preferred ester of this invention. A reaction vessel was fitted with a stirrer, nitrogen inlet tube, thermometer, and a steam jacketed partial condenser fitted to a water condenser and a water trap. The nitrilotriacetic acid and glycol were charged initially and pre-esterified at 170–180 degrees centigrade under agitation and an inert nitrogen sparge until a clear homegenous ester resulted. The charge was then cooled to 100 degrees centigrade, the polycarboxylic compound added, and the esterification continued until the desired level is attained, usually measured by the acid number technique or by other conventional means. The two-step processes are preferred although one-step processes can be utilized in the preparation of the polyester by mixing nitrilotriacetic acid into a reaction mixture of the glycol and polycarboxylic compound at a temperature of about 175 to 180 degrees centigrade. A nitrogen or inert gas purge or pad is preferably used throughout the reaction.

The one-step and two-step processes described above can be carried out at temperatures of 125–200 degrees centigrade, although temperatures of about 160–180 degrees centigrade are preferred. The time necessary to complete the above-described one- or two-step processes may vary from 1–36 hours, although times of from 3–30 hours are preferred and times of from 4–20 hours are most preferred.

The resulting reaction product is a nitrilotriacetic acid based ester containing aliphatic carbon-to-carbon unsaturation. The ester is then mixed with a polymerizable compound containing aliphatic carbon-to-carbon unsaturation.

The polymerizable compound containing aliphatic carbon-to-carbon unsaturation is selected from the conventional olefinic or ethylenically unsaturated cross-linking agents. Typical compounds include styrene, diallyl phthalate, diallyl isophthalate, triallyl cyanurate, acrylic acid, methacrylic acid, methylmethacrylate (and other acrylic and methacrylic esters), vinyl toluene, chlorostyrene, methylstyrene and the like. The compound generally comprises from about 25 to about 50 weight percent of the uncured mixture.

It will be recognized that conventional polymerization inhibitors, such as hydroquinone, benzylquinone, trinitrobenzene, picric acid and the like; polymerization catalysts such as benzoyl peroxide, acetyl peroxide, methyl ethyl ketone peroxide, and the like; dyes; pigments; plasticizers; lubricants; and various other modifying agents are contemplated as being incorporated in certain formulations to produce compositions embraced in this invention in order to obtain or accentuate any given property.

The polymerization conditions for effecting the cross-linking reaction between the unsaturated esters of this invention and the olefinic cross-linking agent may be selected from a wide variety of techniques but usually involve the application of heat or light. Although pressure is not a required condition for effecting polymerization of the polymerizable mixtures embraced within this invention, it is sometimes advantageously employed, particularly when it is desired to make laminates in a pre-formed shape. The temperature at which polymerization is effective depends on a variety of factors, particularly the boiling point of the olefinic cross-linking agent and the exothermic characteristics of the polymerization mixture. A temperature is selected which will give a suitable reaction rate and yet not cause substantial volatilization, in the case of producing very thick castings, which will not produce a product which is not cracked-crazed.

The following examples are presented to illustrate the novel compounds of this invention. It is to be understood that the examples are not to be construed as limiting the invention. All temperatures are in degress centigrade and all parts are by weight, unless otherwise indicated.

Example 1

A charge of 191 grams of nitrilotriacetic acid and 557 grams of ethylene glycol was heated with stirring at a temperature of 174–195 degrees centigrade until the nitrilotriacetic acid triester was formed as measured by the amount of water distilled out of the mixture. Thereafter, the reaction mixture was stripped of unreacted ethylene glycol and the acid number was determined to be below 5 mg. KOH per gram. A charge of 284 grams of maleic anhydride was added and the mixture heated to 100–110 degrees centigrade for two hours. The temperature was then raised to 160 degrees centigrade and subsequently lowered to 50 degrees centigrade.

Example 2

Forty parts of styrene was added to 60 parts of the product of Example 1 with 0.1 percent toluhydroquinone and the mixture heated to 120 degrees centigrade.

A casting was made employing 1 percent methyl ethyl ketone peroxide and 0.2 percent cobalt naphthenate as a room temperature catalyst system. The casting was rigid, rather than a rubbery, solid and had a Barcol hardness of 32.

Examples 3–9

Fllowing the procedure of Examples 1 and 2, useful castings are prepared from the following combinations of polyhydric alcohols, polycarboxylic compounds and olefinic cross-linking agents with the nitrilotriacetic acid:

| Example: | Alcohol | Polycarboxylic compound | Olefinic cross-linking agent |
|---|---|---|---|
| 3 | Diethylene glycol | Maleic anhydride | Styrene. |
| 4 | Propylene glycol | do | Do. |
| 5 | Neopentyl glycol | Maleic acid | Do. |
| 6 | Ethylene glycol | Fumaric acid | Do. |
| 7 | do | do | Diallyl phathlate. |
| 8 | do | Maleic anhydride | Methylmethacrylate. |
| 9 | do | do | Methylstyrene. |

Various changes and modifications can be made in the process and products of this invention without departing from the spirit and scope of the invention. The various embodiments of this invention disclosed herein serve to further illustrate the invention but are not intended to limit it.

I claim:

1. A polymerizable polyester of ingredients consisting essentially of (1) nitrilotriacetic acid, (2) a polyhydric alcohol, and (3) a polycarboxylic compound containing aliphatic carbon-to-carbon unsaturation.

2. The ester of claim 1 wherein said polyhydric alcohol is ethylene glycol and wherein said polycarboxylic compound is maleic anhydride.

3. A polymerizable mixture comprising (A) a polymerizable polyester of ingredients consisting essentially of (1) nitrilotriacetic acid, (2) a polyhydric alcohol, and (3) a polycarboxylic compound containing aliphatic carbon-to-carbon unsaturation, and (B) a polymerizable compound containing aliphatic carbon-to-carbon unsaturation.

4. The mixture of claim 3 wherein said polyhydric alcohol is dihydric, said polycarboxylic compound is dicarboxylic and contains ethylenic unsaturation, and wherein said polymerizable compound is monomeric and contains ethylenic unsaturation.

5. The mixture of claim 4 wherein said polyhydric alcohol is ethylene glycol, said polycarboxylic compound is maleic anhydride, and said polymerizable compound is styrene.

6. The mixture of claim 3 when polymerized to an infusible, insoluble resinous composition.

References Cited

UNITED STATES PATENTS

| 3,197,439 | 7/1965 | Frey | 260—75 |
| 3,223,666 | 12/1965 | Bolton | 260—29.2 |
| 3,275,709 | 9/1966 | Wooster et al. | 260—861 |
| 3,279,940 | 10/1966 | Francis et al. | 117—94 |
| 3,373,144 | 3/1968 | Janssen et al. | 260—75 |

FOREIGN PATENTS

| 842,176 | 2/1939 | France. |

WILLIAM H. SHORT, Primary Examiner

M. GOLDSTEIN, Assistant Examiner

U.S. Cl. X.R.

260—75

PO-1050
(5/69)

UNITED STATES PATENT OFFICE
CERTIFICATE OF CORRECTION

Patent No. 3,555,118            Dated January 12, 1971

Inventor(s) Bruce N. Wilson

It is certified that error appears in the above-identified patent and that said Letters Patent are hereby corrected as shown below:

At column 1, line 30, before "reactivity" read "uncontrollable".

At column 2, line 44, for "homegenous" read "homogenous".

At column 4, in the Table at Example 7, for "Diallyl phathlate" read "Diallyl phthalate".

Signed and sealed this 10th day of August 1971.

(SEAL)
Attest:

EDWARD M. FLETCHER, JR.           WILLIAM E. SCHUYLER, JR.
Attesting Officer                  Commissioner of Patents